Feb. 2, 1960
R. ADELL
2,923,571
ORNAMENTAL AND PROTECTIVE MOLDING FOR
AUTOMOBILE DOOR EDGES
Filed Oct. 7, 1957
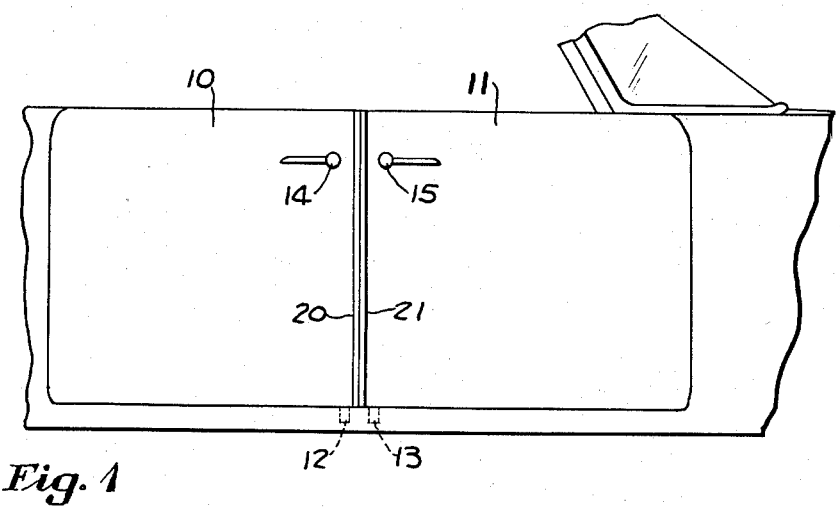
Fig. 1
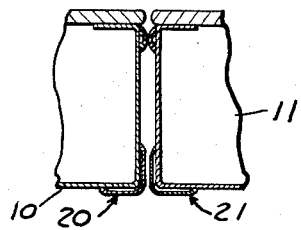
Fig. 2
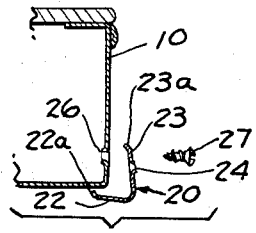
Fig. 3
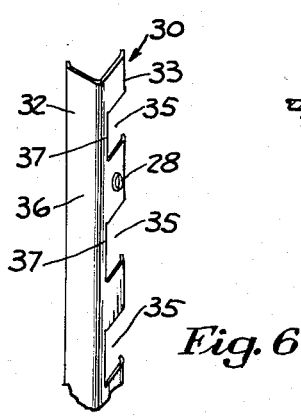
Fig. 4
Fig. 6
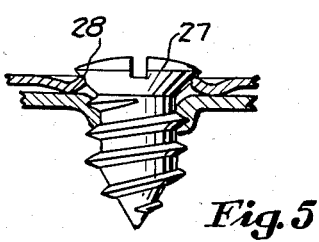
Fig. 5
INVENTOR.
ROBERT ADELL United States Patent Office 2,923,571
Patented Feb. 2, 1960

2,923,571
ORNAMENTAL AND PROTECTIVE MOLDING FOR AUTOMOBILE DOOR EDGES

Robert Adell, Detroit, Mich.

Application October 7, 1957, Serial No. 688,717

2 Claims. (Cl. 296—44)

This invention relates to motor vehicles and more particularly to an improved ornamental and protective molding for the swinging edge of the doors thereof.

Provision of ornamental and protective molding on the trailing edge of doors in which such edge is in the form of a thin flange protruding in the general plane of the door has now been recognized as an unquestionably useful expedient. In spite of the trailing edge of the door being in the form of a relatively thin protruding flange of considerable width, securing ornamental and protective molding even to such edge presented serious difficulties to the solution of which much of the inventive effort of those skilled in the art has been directed within the last several years.

On the other hand, provision of such ornamental and protective molding for automobile doors having swinging edge of an angular cross section with the angle being approximately 90° presents such difficult problems that provision of such moldings therein has been considered impracticable.

One of the objects of the invention is to provide an improved ornamental and protective molding which can be applied to a swinging edge of a door in spite of such edge having a right angle cross section.

Another object of the present invention is to provide an ornamental and protective molding having a door edge of the above nature, which molding is put in tension and, therefore, maintains tight resiliency of its installation.

A further object of the present invention is to provide an improved ornamental and protective molding of the above nature having improved means for retaining such molding in place, which means can be provided on the molding without any additional cost.

A still further object of the present invention is to provide an improved molding of the above nature, which is simple and rugged in construction, dependable in use, easy to apply to an automobile door, and is relatively inexpensive to manufacture and to replace on an automobile.

Further objects and advantages of this invention will be apparent from the following description and appended claims, reference being had to the accompanying drawings forming a part of this specification, wherein like reference characters designate corresponding parts in the several views.

Fig. 1 is a fragmentary elevational view illustrating a motor vehicle including doors provided with ornamental and protective molding embodying the present invention.

Fig. 2 is a sectional view taken in the direction of the arrows on the section plane passing through the line 2—2 of Fig. 1.

Fig. 3 is an exploded view illustrating application of my improved ornamental and protective molding to the door edge.

Fig. 4 is a perspective view showing one of the moldings of Figs. 1-3, separately.

Fig. 5 is a fragmentary sectional view illustrating operation of the screw hole burrs to hold from rotation the screws securing the molding to the door edge.

Fig. 6 is a view similar in part to Fig. 4 and showing a modified construction of my improved molding.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention I provide an improved molding which can be dependably attached to a motor vehicle door having a trailing edge of substantially right angular cross section. In accordance with the invention I utilize, for the purpose of providing a secure connection, both the resiliency of the molding itself as well as connectors securing the molding to the door positively. The resiliency of the molding is utilized to effect tight resilient attachment of the molding to the door, while the connectors, such as screws, are used to hold the molding thereto positively. While burrs caused by punching holes in sheet metal are generally considered to be an unavoidable disadvantage, I utilize such burrs to operate, in effect, as a lock washer by providing such screw holes in such a manner that the burrs extend outwardly and dig into the heads of the screws, as the same are tightened in place, and lock them from rotation.

In the drawings there is shown, by way of example, two forms of my improved molding applied to the swinging edges of doors 10 and 11 of an automobile shown in part in Fig. 1. In the automobile illustrated in Fig. 1 the door post between the front and rear doors is eliminated, and such doors lock to the floor structure of the automobile, as indicated at 12 and 13. Suitable locking means, such as indicated at 12 and 13, are actuated with the aid of door handles 14 and 15. The trailing edges of doors 10 and 11 have cross section of angular shape with such angle being substantially equal to 90°. Because of such construction, the thin trailing edge extending for a considerable distance in the general plane of doors is eliminated and its advantages in attaching ornamental and protective molding to the door edge are not available. In accordance with the invention, there are, nevertheless, provided on said edges molding 20 and 21 of the construction described in detail below.

Fig. 4 illustrates the molding 20 in perspective. Said molding comprises portions 22 and 23 forming in the free condition of the molding an angle $a$ which is somewhat smaller than a 90° angle, an angle of 85° being preferable under most conditions. The free edges of the portions 22 and 23 are rounded as indicated at 22a and 23a. Under certain conditions rounding the edge 23 may not be necessary. The molding is made preferably of stainless steel, with the outer surfaces thereof, particularly that of the portion 22, being polished. In the portion 23 there are provided a number of screw holes such as the one indicated at 24.

In corresponding places of the door edges there are provided holes such as the one indicated in Fig. 3 at 26. Such holes are of slightly smaller diameter than that of the self-tapping screw 27 in order that such screw, being made of hardened steel, cuts a full thread in such hole and ensures tight installation. Such holes may be painted over at the time of manufacturing the doors and thus covered. Such an expedient is desirable if provision of my improved moldings is optional.

In accordance with the invention I discard the former practice of providing the screw holes in such a manner that the burrs thereof extend inwardly and present a smooth hole to the screw head. In accordance with the invention the holes for my improved molding are punched outwardly to have the resulting burrs extending toward the screw heads. As the screw 27 is tightened in place, the burrs 28 dig into the underside of the head, and virtually lock the screw from rotation. While such an expedient may not be as effective as a lock washer, nevertheless it is effective in a very substantial degree and presents an exceedingly advantageous expedient. It is of importance that its provision does not involve any additional expense.

In application, the molding is pressed over the door edge. In the process of such application, the molding is opened or spread, and it grabs the edge and holds it resiliently. The screws 20 are then applied, as described above. Such a connection is both positive and resilient, giving a number of important advantages.

Fig. 6 illustrates a molding 30 similar to molding 20 of Fig. 4 with the exception that the material of its leg 33 is punched out in places as indicated at 35 in order to facilitate bending of the molding in application to curvilinear door edges. It will be noted that the notches 35 are of such a character that there still remains some material between the edge of the notch 35 and the slightly rounded vertex of the angle 36, such portions of the material being designated by the numeral 37. By virtue of such an expedient appearance of the molding on a motor vehicle door does not betray presence of any notches in a closed position of the doors and makes the corner of the molding sufficiently rigid and strong. Occurrence of unsightly gaps because of elimination of the corner of the molding at such notches is also prevented.

By virtue of the above disclosed construction the objects of the present invention listed above and numerous additional advantages are attained.

I claim:

1. In a motor vehicle having a door with the outer corner of its swinging edge being made of sheet metal and having a substantially right angle cross section, an edge protective and ornamental molding provided along said edge, said molding being made of resilient sheet metal and having a polished finish; said molding having, prior to its installation in a door, cross section having angle smaller than that of the door edge in order to put said molding in tension when the same is secured to said edge, the free edges of both legs of the molding being bent inwardly of its cross sectional angle, said molding being provided in its inner leg with outwardly punched screw holes and said door edge having inwardly punched screw holes registering with said first screw holes to have in the assembled position of the edge and the molding a plurality of self-tapping screws inserted through said registering holes in the inward direction, with the inwardly directed burr of the door edge holes providing tubular extensions for cutting additional internal screw threads by the screws, and the outwardly directed burr at the molding holes providing ragged edges digging into the heads of the screws, as the same are tightened for holding said screws from rotation.

2. The construction defined in claim 1, the inner leg of the molding having provided therein uniformly spaced notches extending from the free edge of said leg toward the corner of the cross sectional angle but terminating short of reaching the same to leave some unnotched material in the inner leg adjacent said corner.

References Cited in the file of this patent

UNITED STATES PATENTS

| | | |
|---|---|---|
| 1,542,481 | Spiro | June 16, 1925 |
| 1,967,357 | Fry | July 24, 1934 |
| 2,089,005 | Sherman | Aug. 3, 1937 |
| 2,346,630 | Wagner | Apr. 11, 1944 |
| 2,482,906 | Goodwin | Sept. 27, 1949 |
| 2,504,234 | Strickland | Apr. 18, 1950 |
| 2,685,472 | Adell | Aug. 3, 1954 |
| 2,785,726 | Brush | Mar. 19, 1957 |